(12) United States Patent
Nishimaki (10) Patent No.: US 8,555,293 B2
(45) Date of Patent: Oct. 8, 2013

(54) METHOD AND APPARATUS FOR COMMUNICATION BETWEEN APPLICATION PROGRAMS

(75) Inventor: Akemi Nishimaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1163 days.

(21) Appl. No.: 12/054,275

(22) Filed: Mar. 24, 2008

(65) Prior Publication Data

US 2009/0031322 A1 Jan. 29, 2009

(30) Foreign Application Priority Data

Mar. 28, 2007 (JP) ................................. 2007-084699

(51) Int. Cl.
 *G06F 13/00* (2006.01)
(52) U.S. Cl.
 USPC .......................................... 719/313; 709/227
(58) Field of Classification Search
 USPC ........................................ 719/313; 709/227
 See application file for complete search history.

(56) References Cited

U.S. PATENT DOCUMENTS 7,117,504 B2* 10/2006 Smith et al. ................... 719/328
7,627,681 B2* 12/2009 Nog et al. ..................... 709/228
2001/0007128 A1* 7/2001 Lambert et al. ............... 713/165

FOREIGN PATENT DOCUMENTS

JP 9-139735 A 5/1997

* cited by examiner

*Primary Examiner* — Andy Ho
(74) *Attorney, Agent, or Firm* — Carter, DeLuca, Farrell & Schmidt, LLP (57) ABSTRACT

A communication apparatus includes a reception unit configured to receive a transmission message to be transmitted from a first application to a second application, a determination unit configured to determine whether the second application is present in the same area as the first application, an encoding unit configured to encode the transmission message if the second application is determined to be in an area different from the first application, and a transmission unit configured to transmit the transmission message from the first application to the second application, wherein an encoded transmission message is transmitted if the second application is determined to be present in an area different from the first application, and an un-encoded transmission message is transmitted if the second application is determined to be present in the same area as the first application.

9 Claims, 9 Drawing Sheets

METHOD AND APPARATUS FOR COMMUNICATION BETWEEN APPLICATION PROGRAMS

BACKGROUND OF THE INVENTION

1. Field of the Invention

The present invention relates to a method and an apparatus for communicating data between application programs in a system which includes a plurality of computers connected with one another via a network.

2. Description of the Related Art

With improvement in computer performance and expansion of its connection to a network, information to be saved is distributed to a plurality of computers, and the data saved in a certain computer is referred to from another computer via the network.

Under such an environment, if the data directly flows through the network, there is a risk of sniffing or altering of the data, which causes a security problem. Thus, data has been encrypted prior to transmission. Further, in order to improve communication efficiency, the data has been compressed prior to transmission.

As to the encryption, the following methods have been conventionally employed:

(1) Each application program performs encryption of data, and transmits the encrypted data;
(2) An application program is changed to use encryption protocol such as SecureSocketsLayer (SSL);
(3) Hardware having an encryption function represented by a security router is used to transfer encrypted information between routers;
(4) A relay service for encrypting communication data is performed to encrypt the communication data when a relay program is in an operated state (Japanese Patent Application Laid-Open No. 9-139735).

As to the compression, a conventionally employed method includes a communication adaptor or driver program for controlling the communication adaptor to compress the data. An example of this is Point-to-Point protocol (PPP).

In the case of methods (1) and (2), a change has to be added to the application program, and an existing application cannot be directly used. Changing of the application increases development burdens because it requires addition of an encryption program loading process or incorporation of an encryption function in the program. A general user cannot implement such application change.

In the case of method (3), while security is assured between the routers, communication security cannot be secured through a network within the router.

In the case of method (4), since all communication data is encrypted in the operated state of the relay program, the data which needs no encryption is also encrypted/decrypted. Accordingly, the associated overhead becomes an issue when a high processing speed is required.

As to method (5), as in the case of method (4), since the data which needs no compression is also compressed/decompressed, the associated overhead becomes an issue.

A distributed object system that includes a plurality of applications includes flexibility in a machine configuration or an application arrangement and can change the arrangement from the standpoint of load distribution or usability. Since the application arrangement can be changed, a necessity of encryption or compression of the communication data changes depending on the arrangement. Thus, encryption or compression of the communication data should not be set in a fixed manner.

For example, communication between applications installed in different machines requires encryption of data because of a possibility of communication data alteration. On the other hand, communication between applications installed in the same machine requires no encryption because of a low possibility of communication data alteration. Additionally, in the case of the communication between the applications installed in the same machine, compression of data is not as necessary because no external communication line is used.

While encryption of data is necessary in communication between applications installed in different domains, encryption of data is not necessary in communication between applications installed in the same domain.

On the other hand, unencrypted data may be transmitted without any problems if confidentiality of the communicated data is low.

SUMMARY OF THE INVENTION

The present invention includes the feature of determining the necessity of encryption or compression based on an application arrangement or a nature of communication data. Accordingly, a system of high processing efficiency can be constructed by executing communication data encryption or compression only for truly necessary data.

The present invention also includes the feature of ensuring security by transmitting/receiving encrypted data without changing any existing application program. In addition, efficient communication can be realized by transmitting/receiving compressed data without changing any existing application program.

According to an aspect of the present invention, a method for communicating includes receiving a transmission message to be transmitted from a first application to a second application, determining whether the second application is present in the same area as the first application, encoding the transmission message if the second application is determined to be present in an area different from the first application, and transmitting the transmission message from the first application to the second application, wherein an encoded transmission message is transmitted if the second application is in an area different from the first application and an un-encoded transmission message is transmitted if the second application is in the same area as the first application.

According to another aspect of the present invention, a communication apparatus includes a reception unit configured to receive a transmission message to be transmitted from a first application to a second application, a determination unit configured to determine whether the second application is present in the same area as the first application, an encoding unit configured to encode the transmission message if the second application is determined to be present in an area different from the first application, and a transmission unit configured to transmit the transmission message from the first application to the second application, wherein an encoded transmission message is transmitted if the second application is in an area different from the first application and an un-encoded transmission message is transmitted if the second application is in the same area as the first application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 9:
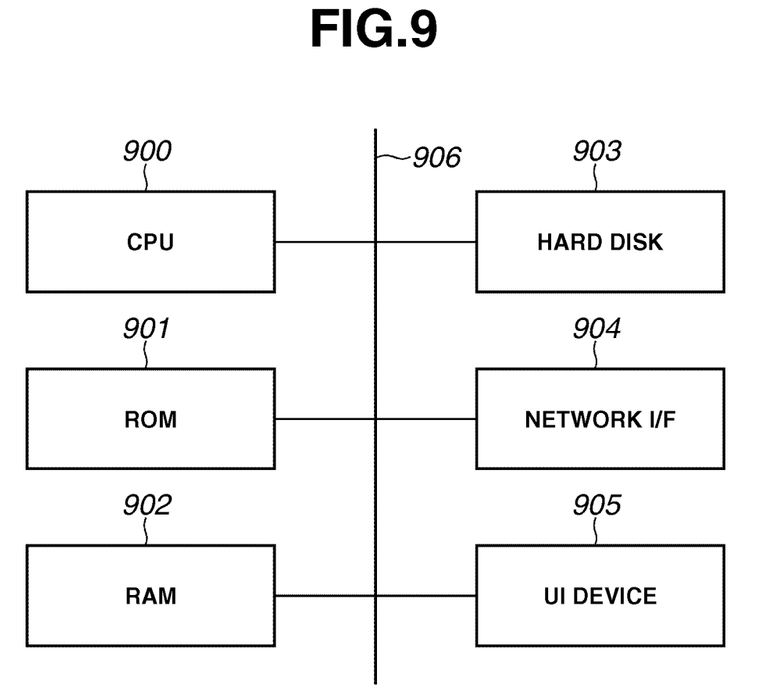
FIG. 9 illustrates a hardware configuration of an apparatus included in the data communication system according to the exemplary embodiment of the invention.

FIG. 9 illustrates an example of a hardware configuration of an apparatus included in a data communication system according to an exemplary embodiment of the present invention.

In the apparatus, a central processing unit (CPU) 900 reads and executes a program stored in a read-only memory (ROM) 901. When the program is executed, a random-access memory (RAM) 902 is used as a primary storage device and a hard disk 903 as a secondary storage device.

The hard disk 903 is also used as a storage device for storing programs. In communicating with other apparatus, a network interface (I/F) 904 is used. In operating the apparatus or displaying of a status, a user interface (UI) device 905 is used. Devices are interconnected via a bus 906.

Figure 1A:
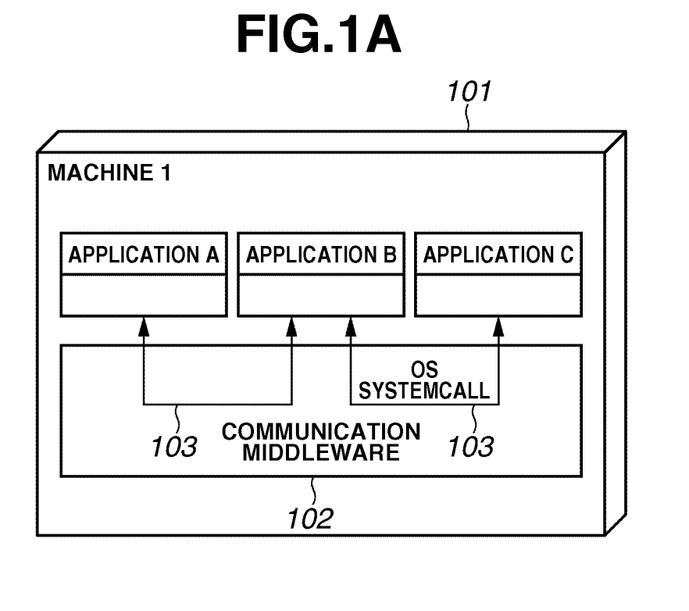
FIGS. 1A and 1B illustrate a configuration of a data communication system according to an exemplary embodiment of the present invention.
Figure 1B:
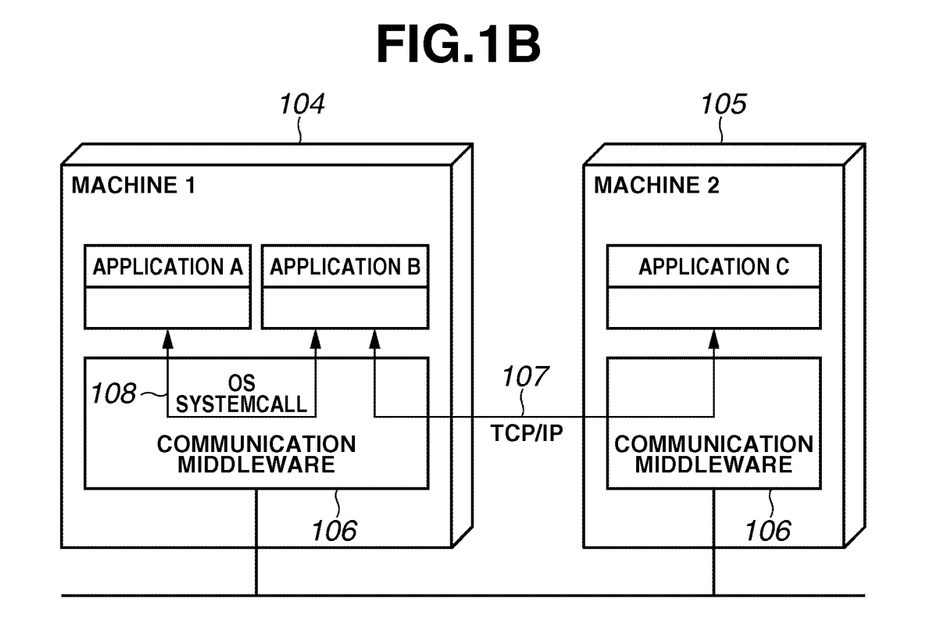

FIGS. 1A and 1B illustrate a configuration of the data communication system which selectively carries out encoding according to the exemplary embodiment of the invention. FIG. 1A illustrates an arrangement of all applications in the same machine, and FIG. 1B illustrates an arrangement of a plurality of applications in a plurality of machines.

FIG. 1A illustrates an example where all applications A, B, and C are arranged in the same machine 101, and communication is carried out using a communication middleware 102. In this case, communication between the applications A, B, and C is executed using a system call 103 of the machine 101.

FIG. 1B illustrates an example where the applications A and B are arranged in one machine 104, while the application C is arranged in another machine 105, and a communication middleware 106 is used. In this case, communication between the machines of the applications B and C is carried out by socket communication 107 of Transmission Control Protocol/Internet Protocol (TCP/IP) via the communication middleware 106. Communication between the applications A and B arranged in machine 104 is carried out using a system call 108 of an operating system (OS).

Thus, the middleware 106 selects an optimal communication method by considering application arrangement. The plurality of applications that communicate with one another can be installed by a unit of a bundle.

Figure 2:
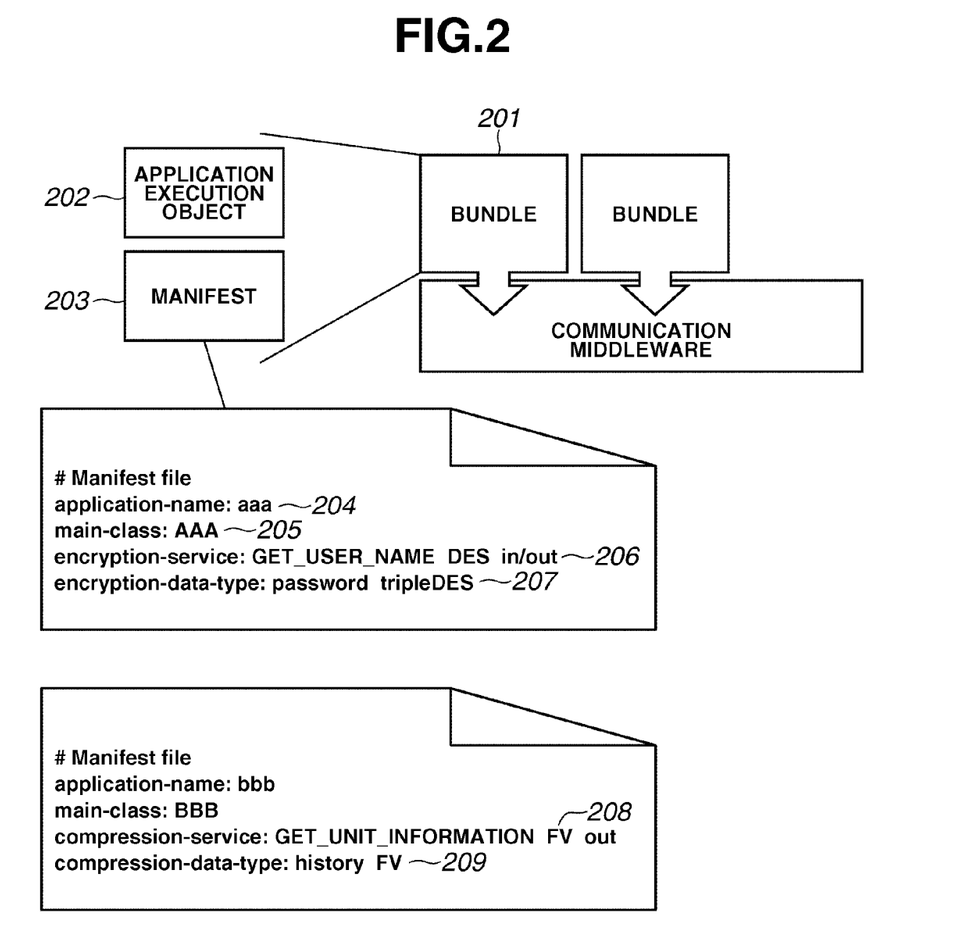
FIG. 2 illustrates a bundle according to the exemplary embodiment of the invention.

FIG. 2 illustrates an example of a bundle. A bundle 201 includes an application execution object 202 and a manifest file 203.

The manifest file 203 contains an application name 204, a cluster name 205 that is first referred to when an application is executed, a service 206 to be encrypted, and a data type 207 to be encrypted.

The service 206 indicates a function provided from one application to another. The service 206 receives input data, and executes the function to transmit output data. One application may provide a plurality of services.

As to the service required to be encrypted, a service name, an encoding method, and each encryption instruction for input and output is written.

For the encryption instruction of each different input/output, "in" is written when a side using a service wishes to encrypt input data that is to be transferred to the service. "Out" is written when output data of a service processing result is to be encrypted, and "in/out" is written when both are to be encrypted.

Among the data which the application transmits, as to the data that requires encryption, a type of data to be encrypted and an encryption method 207 are designated.

Services that require compression can be contained in the manifest file as shown in FIG. 2. As to the services required to be compressed, a service name, an encoding method, and each encryption instruction 208 for input and output are written. Among the data which the application transmits, as to data that requires encryption, a type of data to be compressed and a compression method 209 are designated.

Figure 3:
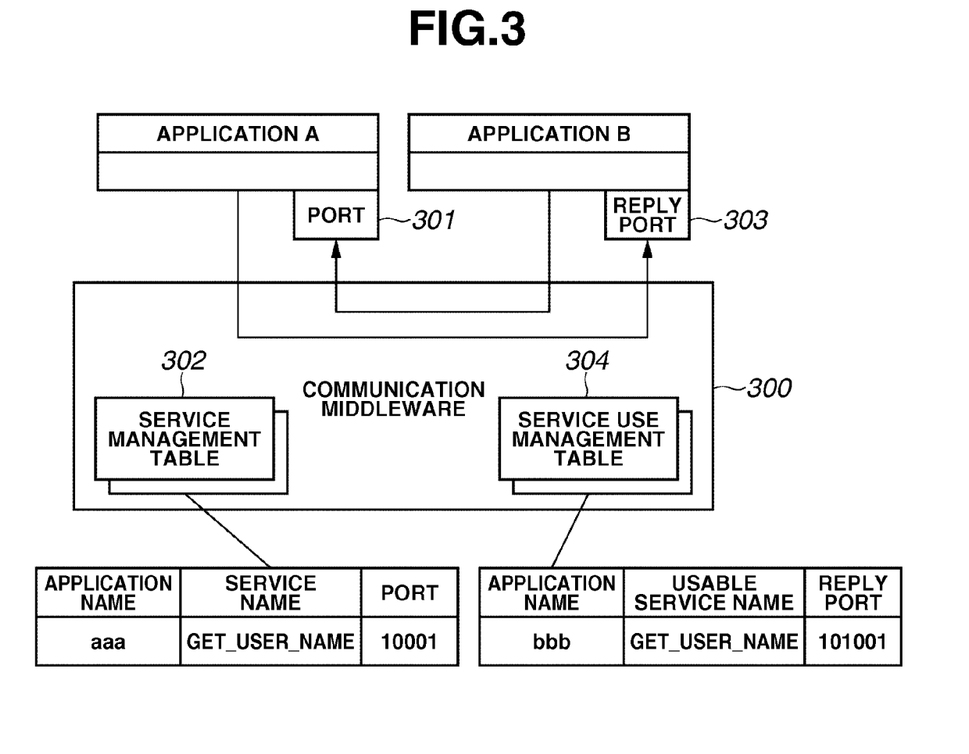
FIG. 3 illustrates a configuration of a communication middleware according to the exemplary embodiment of the invention.

FIG. 3 illustrates a configuration where the application A can use a service "GET_USER_NAME" for obtaining a list of user names from another application.

A communication middleware 300 generates a service providing port 301 which supports a service provided by the application A. A communication middleware 300 holds an application name (defied in a manifest), a provided service name, and a port associated with one another in a service management table 302.

When the service "GET_USER_NAME" is used from the application B, the communication middleware 300 generates a reply port 303 which enables the application B to receive output data of the service. In this case, the communication middleware 300 associates the application, the usable service, and the reply port with one another and holds them in a service use management table 304. Input data is transmitted to the service providing port 301, while output data is transmitted to the reply port 303 of a side using the service.

Figure 4:
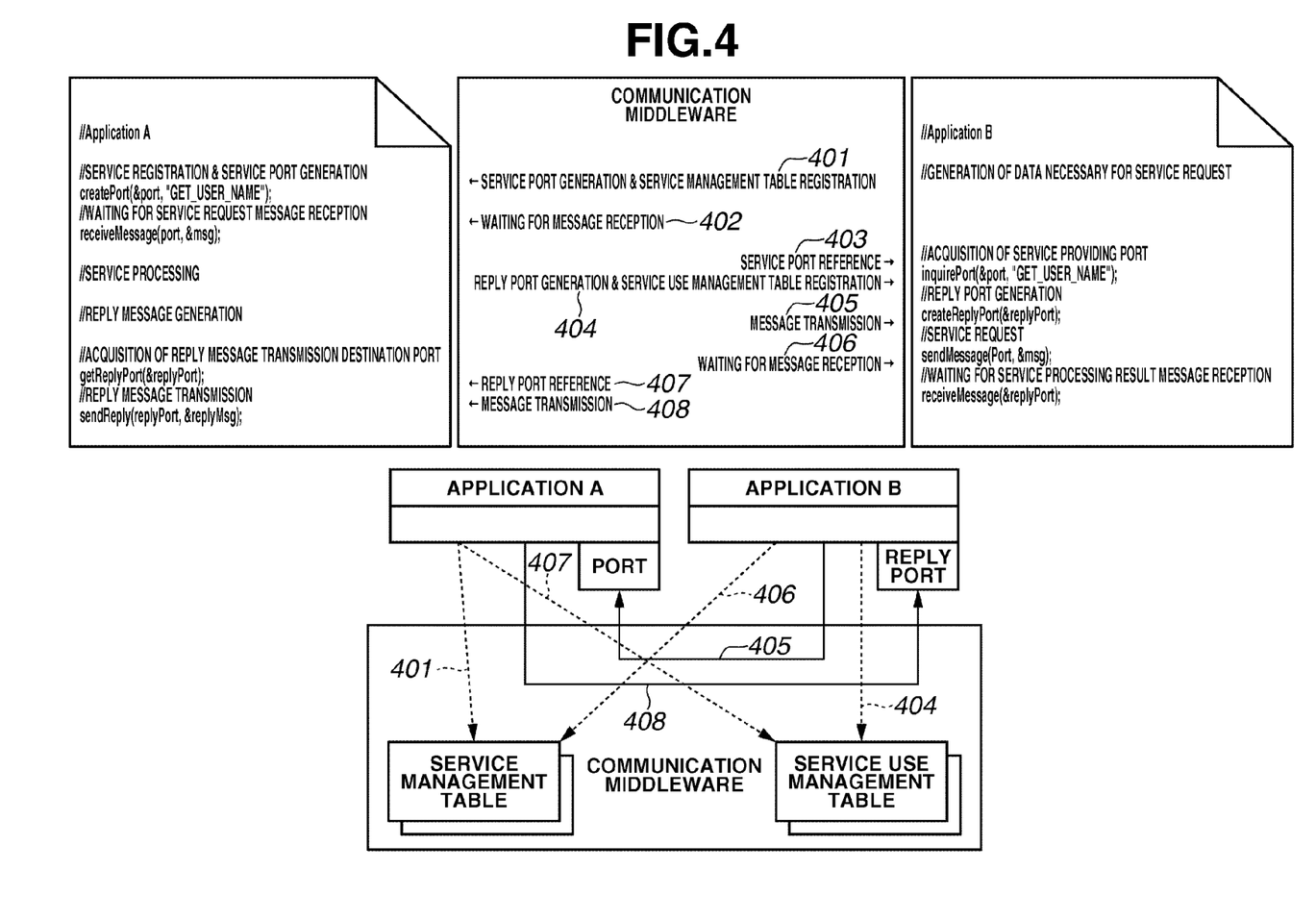
FIG. 4 illustrates a communication control process in the communication middleware according to the exemplary embodiment of the invention.

FIG. 4 illustrates a communication control process between the applications which uses the configuration of FIG. 3.

First, the application A registers a service name to identify a service in the communication middleware. The communication middleware generates a port for the service (401). The application A shifts to an input data reception waiting state (402).

The application B designates, when it uses a service, a service name "GET_USER_NAME" to obtain a connection port (403). The application B generates a reply port to receive output data which is a service processing result (404). Then, the application B transmits input data to a service port that is to be used (405) and wait for reception of output data (406).

The application A obtains a user side reply port to transmit the output data (407), and transmits a list of user names via the communication middleware (408).

Figure 5:
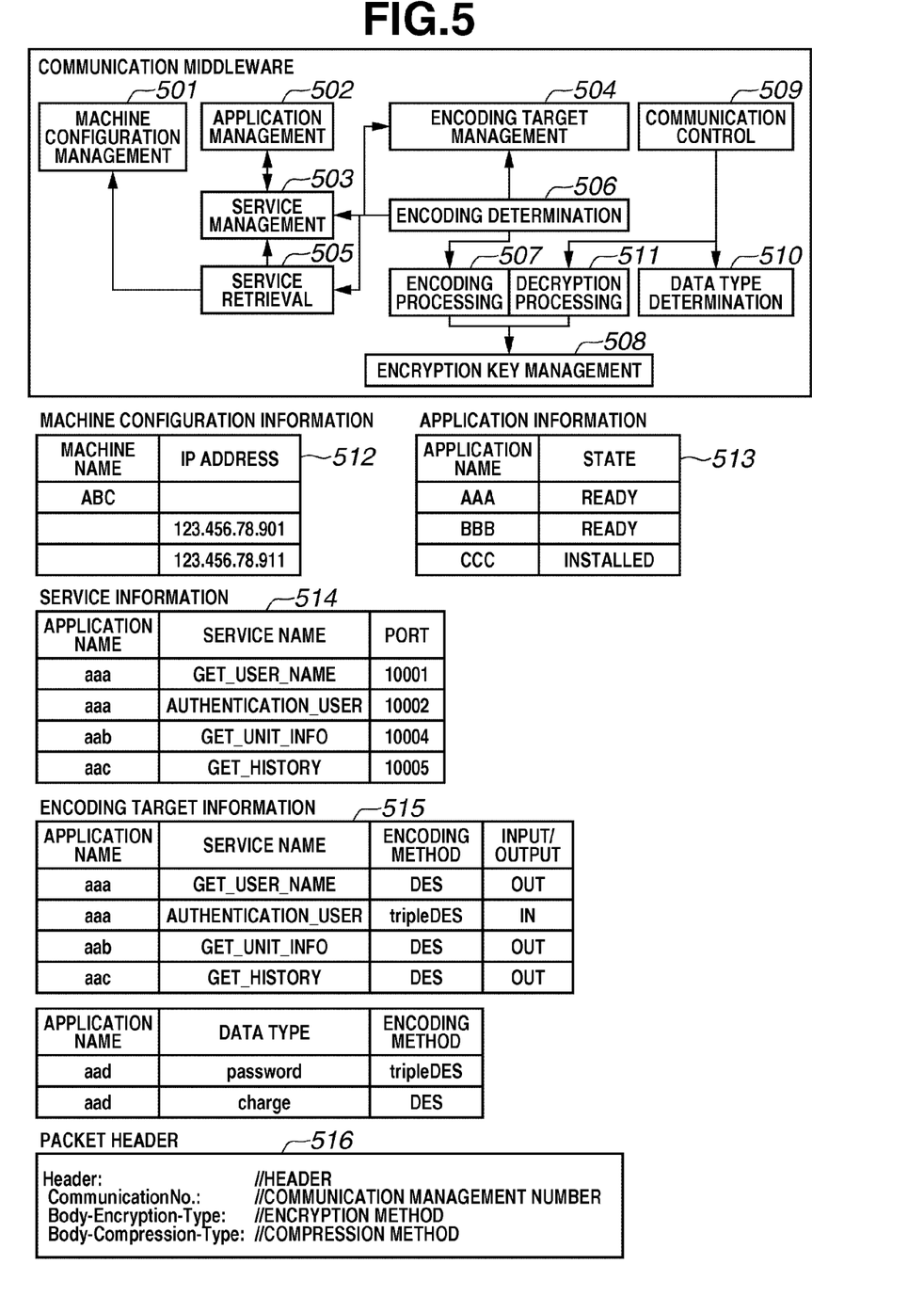
FIG. 5 illustrates a detailed configuration of the communication middleware and management information for management according to the exemplary embodiment of the invention.

FIG. 5 illustrates a detailed configuration of the communication middleware. When a system is constructed by a plurality of machines, a communication middleware of FIG. 5 is present for each machine.

A machine configuration management unit 501 manages machine configuration of the entire system. The machine configuration management unit 501 obtains an IP address or a machine name of a plurality of machines included in the system to hold it as machine configuration information 512 therein.

An application management unit 502 manages a bundle installed in its communication middleware. Accordingly, the application management unit 502 holds applications installed in the form of a bundle, and life cycles thereof as application information 513. When a new bundle is added, the application management unit 502 adds its information to the application information 513, and deletes relevant information from the application information 513 when the bundle is uninstalled.

A service management unit 503 manages services provided from applications. The service management unit 503 holds service information 514 which contains three items: an application name (defined in a manifest), a name of the provided service, and a service port. When an application registers a service for the communication middleware, service information is added. When an application discards a registered service, relevant service information is deleted. When an application is uninstalled, related service information is discarded. Thus, the application management unit 502 and the service management unit 503 manage states of the applications.

An encoding target management unit 504 obtains an encryption target service or a data type contained in the manifest file of the application to hold encoding target information 515. The following two types are included in encoding target information 515:
(1) Service encoding target information: an application name, a service name, an encoding method, and designation of input data/output data.
(2) Data type encoding target information: an application name, a data type, and an encoding method.

The encoding target information is registered at the time of installing an application, and deleted when the application is uninstalled. The encoding target management unit 504 registers a communication message type or a data type to be encoded.

A service retrieval unit 505 retrieves a service arrangement place when an application that uses a service transmits input data to an application providing the service. The service retrieval unit 505 retrieves a communication destination application based on information held by the application management unit 502.

An encoding determination unit 506 determines whether encoding of communication data is necessary by using the service retrieval unit 505 and the encoding target management unit 504. More specifically, based on the application arrangement obtained from the service retrieval unit 505, the encoding determination unit 506 determines that encoding is unnecessary in the case of applications in the same machine. In the case of applications in different machines, the encoding determination unit 506 determines that encoding is necessary if the data is an encoding target of the encoding target management unit 504.

An encoding processing unit 507 obtains an encoding method from the encoding target information held by the encoding target management unit 504 to execute an encoding process by a designated method.

An encryption key management unit 508 holds a key used for encoding/decrypting. The key is stored at the time of constructing the communication middleware.

A communication control unit 509 selects a communication method based on the application arrangement. In the case of communication between applications within a local machine, the communication is carried out using a system call of the OS. In the case of application communication between remote machines, packet communication of TCP/IP is carried out. For the packet communication, a packet header 516 unique to communication middleware is added in communication. The header contains information indicating a format of encryption processing and information indicating a format of compression processing. The communication control unit 509 carries out the communication between the applications with the communication middleware.

A data type determination unit 510 analyzes the packet header of data transmitted from the communication control unit 509 to determine whether the received data has been encoded. If encoded, the data type determination unit 510 extracts an encoding method.

A decryption processing unit 511 decrypts the encoded data. In the decryption process, the key held in the encryption key management unit 508 is used. The decryption processing unit 511 decrypts (or decompresses) a received message.

Figure 6:
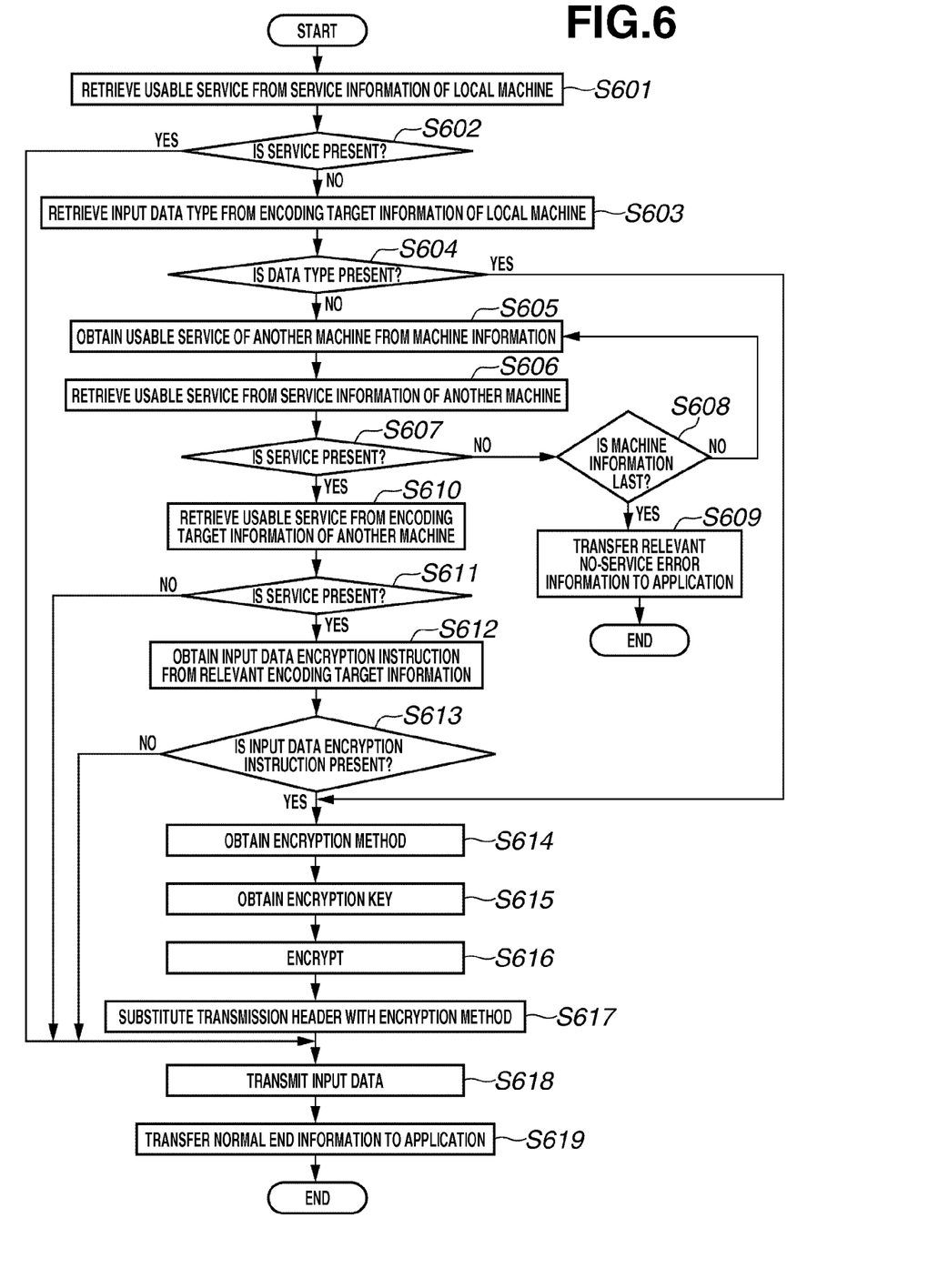
FIG. 6 is a flowchart illustrating an input data transmission process of the services according to the exemplary embodiment of the invention.

FIG. 6 illustrates a processing flow of the communication middleware when an application uses a service. When the application designates a port to transmit input data, the communication middleware transmits the input data.

In step S601, the communication middleware retrieves a service to be used from service information held by the service management unit 503 of the local machine to determine whether the information contains the usable service in step S602. If the usable service is contained (YES in the step S602), the communication middleware directly transmits the input data in step S618 and in step S619 transmits to the application that instructed the transmission that the transmission has ended normally. If the service is not found in the local machine (NO in the step S602), the communication middleware retrieves a type of the input data to be transmitted, from the data type encoding target information held by the encoding target management unit 504 of the local machine, in step S603.

The communication middleware determines whether the encoding target information contains the input data type in step S604. If the input data type is contained (YES in step S604), the encoding processing unit of the local machine encrypts the input data in steps S614 to S617. The communication middleware then transmits data to the designated port in steps S618 and S619.

If the data type is not contained (NO in step S604), the communication middleware obtains an IP address or a machine name of a remote machine from the machine information held by the machine configuration management unit 501 in step S605. The communication middleware connects to the remote machine to make an inquiry about presence of the usable service to the service management unit 503 of the machine in step S606.

The communication middleware determines whether the usable service is present in the service management unit 503 of the remote machine in step S607. If the usable service is not present (NO in step S607), then in step S608, the communication middleware determines whether there is additional machine information. If there is, flow returns to step S605. If there is not, then in step S609, the communication middleware transfers error information indicating that the service has not been found to the application that instructed the transmission.

If the usable service is present in the remote machine (YES in step S607), the communication middleware retrieves the usable service from the service encoding target information of the encoding target management unit 504 of the remote machine in step S610. The communication middleware determines whether the service encoding target information contains the usable service in step S611. If the usable service is contained (YES in step S611), the communication middleware obtains presence or nonpresence of encryption instruction of the input data from the service encoding target information in step S612.

If it is determined that encryption instruction of the input data is present in step S613, the communication middleware encrypts the input data with the encoding processing unit 507 of the local machine in steps S614 to S617 and transmits data to the designated port in steps S618 and S619.

The encoding processing unit 507 obtains the usable service or an encryption method set for each input data type from the encoding target information in step S614 to encrypt the data by the designated method in S616.

The encoding processing unit 507 uses the encryption key held by the encryption key management unit 508 in step S615. The communication middleware substitutes a transmission header with the encryption method when it transmits encrypted data in step S617, and transmits the header and the encrypted input data in step S618.

Figure 7:
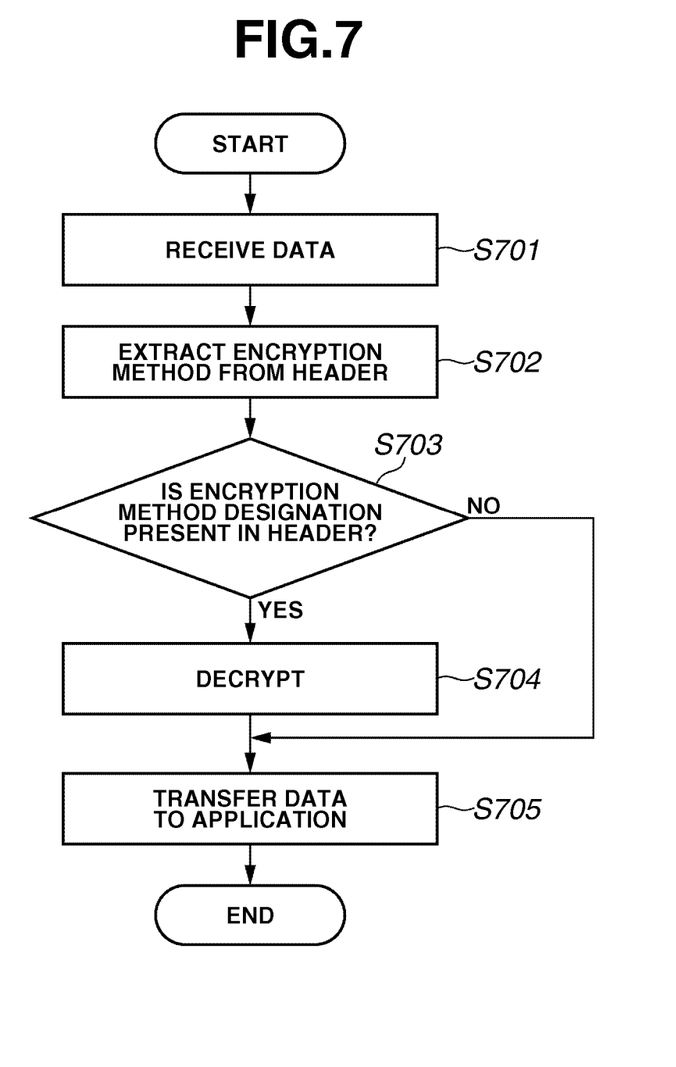
FIG. 7 is a flowchart illustrating processing of received data according to the exemplary embodiment of the invention.

FIG. 7 illustrates a processing flow of the communication middleware when communication data is received.

The communication middleware receives data in step S701. The communication middleware extracts information about an encryption method from a header of the received data in step S702.

Next, the communication middleware determines whether the extracted data has been encrypted in step S703. If the extracted data has been encrypted, the communication middleware decrypts the received data in step S704 to transfer the data to the application in step S705. If the extracted data has not been encrypted, the communication middleware directly transfers the data to the application in step S705.

Figure 8:
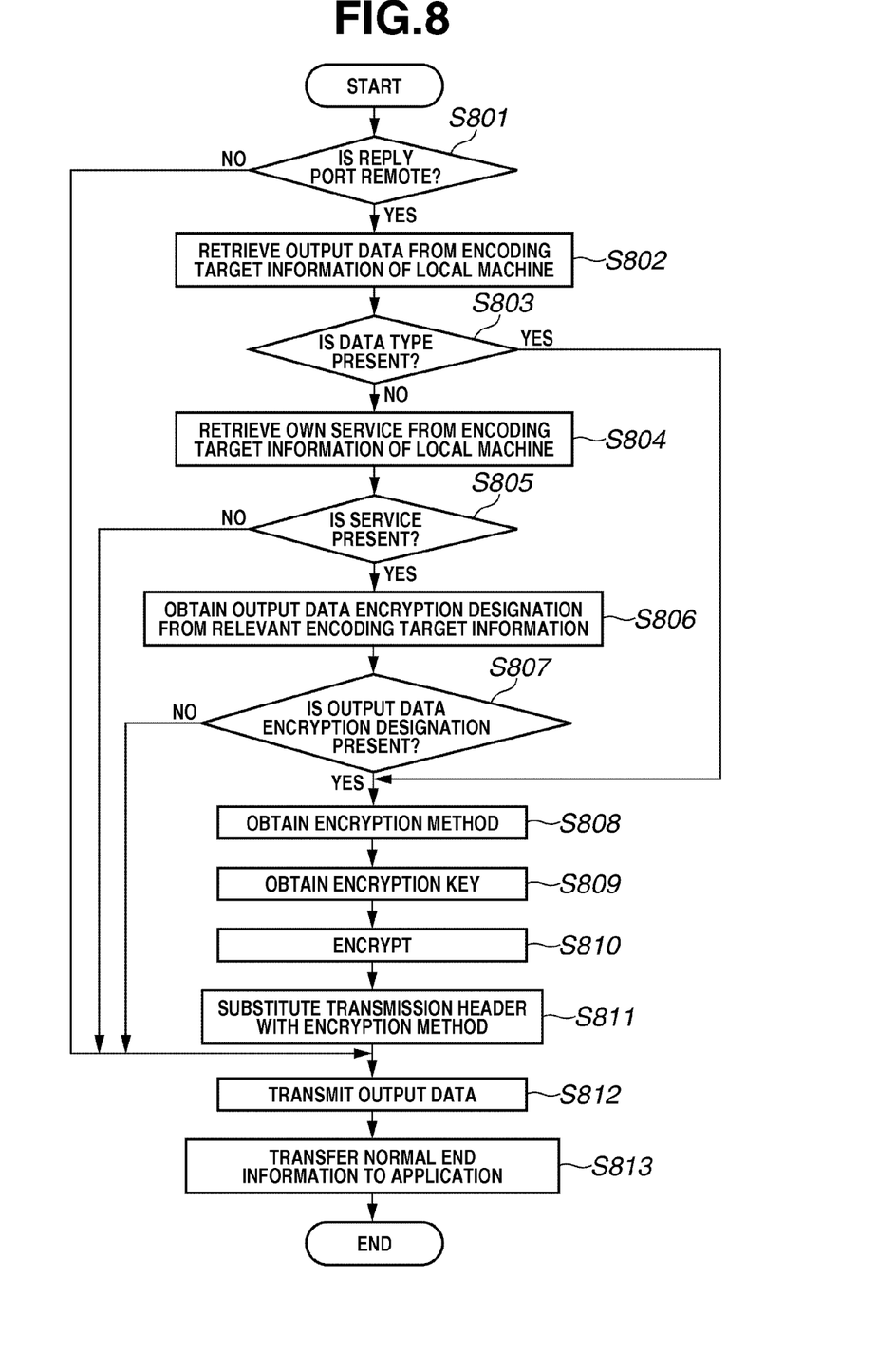
FIG. 8 is a flowchart illustrating an output data transmission process of the services according to the exemplary embodiment of the invention.

FIG. 8 illustrates a processing flow of the communication middleware when an application that provides services transmits output data. When the application completes processing of the services which it provides, and designates a reply port to transmit output data, the communication middleware executes a transmission process of the output data.

The communication middleware determines whether a communication destination reply port of the output data is a remote machine in step S801.

If the reply port is a port within a local machine (NO in step S801), the communication middleware directly transmits the output data in step S812, and provides notification that a transmission process has normally ended to the application which has instructed the transmission in step S813.

If the reply port is a remote machine (YES in step S801), the communication middleware retrieves a type of output data to be transmitted, from the data type encoding target information held by the encoding target management unit 504 of the local machine in step S802. Then, the communication middleware determines whether the output data type is contained in the encoding target information in step S803. If the output data type is contained (YES in step S803), the communication middleware encrypts the output data with the encoding processing unit 507 of the local machine in steps S808 to S811, and transmits the data to the designated reply port in steps S812 and S813.

On the other hand, if the output type is not contained in the encoding target information (NO in step S803), the process proceeds to step S804. The communication middleware retrieves a relevant service in the service encoding target information held by the encoding target management unit 504 of the local machine in step S804 to determine whether the service is contained in the encoding target information in step S805. If the service is contained (YES in step S805), the communication middleware obtains encryption instruction of the output data in step S806 and determines whether output data encryption has been designated in step S807. If encryption has been instructed (YES in step S807), the communication middleware encrypts the output data with the encoding processing unit 507 of the local machine in steps S808 to S811 to transmit the data to the designated port in steps S812 and S813.

If encryption has not been instructed (NO in step S807), the communication middleware directly transmits the output data in step S812 and provides a message to the application that instructed the transmission that the transmission process ended normally in step S813.

The encoding processing unit 507 obtains an encryption method set for each usable service or output data, from the encoding target information in step S808, to encrypt the data with a designated system in step S810. The encoding processing unit 507 uses an encryption key held by the encryption key management unit 508 in step S809. When the encrypted data is transmitted, the communication middleware substitutes a transmission header with data indicating the encryption method in step S811, and transmits the header and the encrypted output data in step S812.

The encoding target management unit 504 included in the communication middleware of FIG. 5 manages an encryption target data type and a service. The encoding target management unit 504 may also include a compression target data type and a service in its management. If the management of data includes compressing target information, an encryption or compression process can be performed within the communication middleware.

Further, if a compression instruction of a data type or a service is included in a manifest, a compression process can be performed in addition to encryption. By instructing both encryption and compression for one data type or one service, the compressed data can be additionally encrypted.

By designating only compression as an encoding target in the manifest, a compression process can be carried out in the communication middleware.

In the input data transmission process flow of the service shown in FIG. 6, in steps S607 and S611, the communication middleware determines whether to execute encoding based on whether a transmission destination application is within the local machine or in a remote machine. That is, by changing the determination process, a determination is made based on whether the transmission destination application is in the same domain or another domain. Thus, encryption or compression can be carried out when a domain is different.

The present invention includes a case where, based on an instruction of a program code read from a storage medium, a CPU realizes the functions of the exemplary embodiment.

As to the storage medium which provides the program code, for example, a floppy disk, a hard disk, an optical disk, a magneto-optical disk, a compact disk (CD), a digital versatile disk (DVD), a magnetic tape, a nonvolatile memory card, or a ROM can be used.

The present invention also includes a case where in an image input apparatus or an information storage device, or an apparatus having these devices combined or connected, a CPU installed in both or one of the devices executes a part or all of an actual process to realize the functions of the exemplary embodiment.

As to the image input apparatus, a camera or a scanner using various charge coupled devices (CCD) such as a video camera, a digital camera, and a monitor camera, or an image input apparatus where an image from an analog image input apparatus is converted into a digital image by AD conversion, can be used. As to the information storage device, an external hard disk or a video recorder can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-084699 filed Mar. 28, 2007, which is hereby incorporated by reference herein in its entirety.

What is claimed is:

1. A method for communicating, the method comprising:
receiving a transmission message to be transmitted from a first application to a second application;
searching for the second application in the same area that the first application is present;
transmitting the transmission message as it is from the first application to the second application if the second application has been found in the same area as the first application;
searching for the second application in an area different from the area of the first application if the second application has not been found in the same area as the first application;
encoding the transmission message if the second application has been found in the area different from the area of the first application; and
transmitting the encoded transmission message from the first application to the second application if the second application has been found in the area different from the area of the first application.

2. The method according to claim 1, wherein at least one of the same area and the different area includes an apparatus.

3. The method according to claim 1, wherein at least one of the same area and the different area includes a network domain.

4. The method according to claim 1, wherein the encoding includes encryption.

5. The method according to claim 1, wherein the encoding includes compression.

6. The method according to claim 1, further comprising, when the second application has been found in the area different from the area of the first application, transmitting the transmission message as it is to the second application if a type of the transmission message is not included in a predetermined encoding target.

7. The method according to claim 1, further comprising encoding and transmitting the transmission message using a communication middleware.

8. A computer-readable storage medium storing a computer-executable program, the computer-executable program causing a computer to execute a method for communicating, the method comprising:
receiving a transmission message to be transmitted from a first application to a second application;
searching for the second application in the same area that the first application is present;
transmitting the transmission message as it is from the first application to the second application if the second application has been found in the same area as the first application;
searching for the second application in an area different from the area of the first application if the second application has not been found in the same area as the first application;
encoding the transmission message if the second application has been found in the area different from the area of the first application; and
transmitting the encoded transmission message from the first application to the second application if the second application has been found in the area different from the area of the first application.

9. A communication system implemented by a computer system, comprising:
a reception unit configured to receive a transmission message to be transmitted from a first application to a second application;
a first search unit configured to search for the second application in the same area as the first application is present;
a first transmission unit configured to transmit the transmission message as it is from the first application to the second application if the second application has been found in the same area as the first application;
a second search unit configured to search for the second application in an area different from the area of the first application if the second application has not been found in the same area as the first application;
an encoding unit configured to encode the transmission message if the second application has been found in the area different from the area of the first application; and
a second transmission unit configured to transmit the encoded transmission message from the first application to the second application if the second application has been found in the area different from the area of the first application.

* * * * *